United States Patent Office 2,703,813
Patented Mar. 8, 1955

2,703,813

ORGANIC PHOSPHORUS COMPOUNDS

William T. Dye, Jr., Dayton, Ohio, assignor to Monsanto Chemical Company, St. Louis, Mo., a corporation of Delaware No Drawing. Application March 19, 1952, Serial No. 277,545

9 Claims. (Cl. 260—551)

The present invention refers to organic phosphorus compounds and more particularly provides the hitherto unknown adducts of certain hexaalkylphosphorous triamides and hexachlorobutadiene and methods of producing said adducts.

I have found that when hexachlorobutadiene is contacted with a hexaalkylphosphorous triamide in which each alkyl radical has from 1 to 4 carbon atoms there are formed well-defined, water-soluble, oily to semi-solid addition products which may be employed for a variety of industrial and agricultural purposes, e. g., as rodenticides, insecticides, dyestuff-intermediates, etc.

Reaction of hexachlorobutadiene with the hexaalkylphosphorous triamides to form the present adducts is surprising, for the halogenated butadiene has been generally regarded as an extremely unreactive compound. Thus, the resistance of hexachlorobutadiene to usual reagents has been commented upon by McBee and Hatton (Ind. Eng. Chem., 41, 811–12 (1949)), while Fruhwirth (Berichte, 74B, 1701 (1941)) has pointed out the unique inertness of the compound as an example of the steric hindrance of conjugated double bonds which may be effected by numerous chlorine atoms.

In the present instance, however, hexachlorobutadiene adds very readily to the hexaalkylphosphorous triamides. Reaction is brought about by simply mixing the diene with the amide in any proportion and in the presence or absence of a solvent, at ordinary or increased temperatures, and allowing the resulting mixture to stand until formation of the adducts has occurred. The addition reaction takes place rapidly, with evolution of heat. Hence in order to regulate the reaction it is advisable to operate in the presence of an inert solvent or diluent, e. g., dioxane, diethyl carbitol, ether, toluene, benzene, hexane, etc. External cooling of the reaction mixture and gradual introduction of the reactants also result in smooth operation. Initiation of the reaction is generally evidenced by yellowing of the reaction mixture and evolution of heat. As the reaction progresses, a dark red oil or crystalline solid, depending upon the reaction conditions, separates out. The crystalline solid, when formed, generally is transformed into a dark red oil as the reaction proceeds. The addition reaction seems virtually complete when heat evolution ceases. The lower layer, which comprises the new adducts, may be separated by simply decanting off the solvent or excess reactants layer. The residual dark red oil is a very viscous material which generally solidifies to a thick gum upon cooling. It is water-soluble and gives a strongly positive ionic chloride test.

Irrespective of the proportion of reactants employed, the reaction results in the formation of an adduct in which the hexachlorobutadiene is combined with the triamide. Therefore, if desired, an excess of the hexachlorobutadiene may be employed to serve as the reaction diluent. For total utilization of the hexachlorobutadiene, however, the proportion of triamide present is advantageously in excess of the diene.

While I do not know the exact structure of the red, oily hexachlorobutadiene-hexaalkylphosphorous triamide adducts, the yields, the elemental analysis of the products, and, in some cases, the recovery of unreacted hexachlorobutadiene, point to adducts in which one mole of the dienic compound is combined with from 2 to 4 moles of the triamide. The water-solubility of the adducts and their ionizable chlorine content indicate quaternary structure. Inasmuch as the structural formula of the present products cannot readily be determined, it is preferred to characterize them simply as quaternary adducts of hexachlorobutadiene with the hexaalkylphosphorous triamide.

The invention is further illustrated by the following examples.

Example 1

A mixture consisting of 0.02 mole (5.2 g.) of hexachlorobutadiene, 0.085 mole (13.9 g.) of hexamethylphosphorous triamide and 25 cc. of diethyl carbitol was prepared and the mixture allowed to stand for 10 minutes during which time the temperature of the mixture climbed to 80° C. The reaction mixture was cooled to 60–65° C. and held there for another 10 minutes. The mixture was cooled and the upper layer decanted from the residual dark lower layer. The latter was washed with dioxane and then dried to constant weight in a vacuum oven at a temperature of 75° C. Analysis of the resulting dark red almost solid adduct gave an ionic chlorine content of 17.72 per cent, which indicates quaternary structure of the adduct.

Example 2

A mixture consisting of 7.8 g. (0.03 mole) of hexachlorobutadiene, 4.9 g. (0.03 mole) of hexamethylphosphorous triamide and 100 cc. of diethyl carbitol was heated, with stirring to a temperature of about 50° C., during which time a small quantity of flakes formed in the reaction mixture. The temperature was raised to 130° C. in about 10 minutes, and held there 15 minutes, during which time the mixture slowly began to darken. The temperature of the reaction mixture was finally raised to 175° C. within another 10 minute period. At this point a dark red oil had formed in the mixture. Upon cooling the reaction mixture, the oil solidified to a thick gum.

Example 3

To a 100 cc. flask there was introduced 0.02 mole (5.2 g.) of hexachlorobutadiene, 0.02 mole (3.3 g.) of hexamethylphosphorous triamide and 25 cc. of diethyl carbitol. Evolution of heat was noticed as soon as all of the reactants had been introduced. The reaction mixture was allowed to stand for 10 minutes during which time it consisted first of a suspension of pale yellow crystalline solid in a light yellow liquid. The solid slowly became oily and finally settled out as a red oil. The mixture was then heated to 60° C. for 10 minutes and cooled. After decanting off the upper layer the residual red material was washed with dioxane and dried in a vacuum oven at a temperature of 75° C. Analysis of the resulting almost solid dark red adduct gave an ionic chloride value of 21.55 per cent, which indicated a quaternary structure.

Example 4

Hexachlorobutadiene was added to an equal volume of hexamethylphosphorous triamide in a small reaction vessel. An exothermic reaction began immediately and the reaction mixture darkened considerably and very rapidly to yield a dark red oil, which almost solidified when the reaction mixture reached room temperature.

Example 5

This example is like Example 4, except that instead of employing hexamethylphosphorous triamide, hexaethylphosphorous triamide was used. The reaction appeared to be even more rapid than that observed in Example 4. In the present instance the product obtained upon cooling was a deep red oil.

What I claim is:

1. An adduct of hexachlorobutadiene and a hexaalkylphosphorous triamide in which each alkyl radical has from 1 to 4 carbon atoms, said adduct being produced by contacting the hexachlorobutadiene with said triamide.

2. An adduct produced by contacting hexachlorobutadiene with hexamethylphosphorous triamide.

3. An adduct produced by contacting hexachlorobutadiene with hexaethylphosphorous triamide.

4. The process which comprises contacting hexachlorobutadiene with a hexaalkylphosphorous triamide in which each alkyl radical has from 1 to 4 carbon atoms and recovering from the resulting reaction product an adduct in which said diene is combined with said triamide.

5. The method which comprises contacting hexachlorobutadiene with hexamethylphosphorous triamide and recovering from the resulting reaction product an adduct in which said diene is combined with said triamide.

6. The method which comprises contacting hexachlorobutadiene with hexaethylphosphorous triamide and recovering from the resulting reaction product an adduct in which said diene is combined with said triamide.

7. The method which comprises contacting hexachlorobutadiene, in an inert diluent, with a hexaalkylphosphorous triamide in which each alkyl radical has from 1 to 4 carbon atoms and recovering from the resulting reaction product an adduct in which said diene is combined with said triamide.

8. The method which comprises contacting hexachlorobutadiene with hexamethylphosphorous triamide, in an inert diluent, and recovering from the resulting reaction product an adduct in which said diene is combined with said triamide.

9. The method which comprises contacting hexachlorobutadiene with hexaethylphorphorous triamide, in an inert diluent, and recovering from the resulting reaction product an adduct in which said diene is combined with said triamide.

References Cited in the file of this patent

UNITED STATES PATENTS

| | | |
|---|---|---|
| 1,990,609 | Meis | Feb. 12, 1935 |
| 2,146,584 | Lipkin | Feb. 7, 1939 |
| 2,160,841 | Dreyfus | June 6, 1939 |

FOREIGN PATENTS

| | | |
|---|---|---|
| 201,549 | Switzerland | Mar. 1, 1939 |

OTHER REFERENCES

Michaelis, "Liebigs Annalen," vol. 326 (1903), pp. 169, 170.

Michaelis et al., "Ber. deut. Chem.," vol. 28 (1895), pp. 2205–2211.

Kosolapoff, "Organo-Phosphorous Compounds," Oct. 12, 1950, pp. 326, 327.